United States Patent [19]

DeVeau, Jr. et al.

[11] Patent Number: 5,220,630
[45] Date of Patent: Jun. 15, 1993

[54] OPTICAL FIBER THREE-ROD CONNECTOR HAVING A ROD-SECURING CLIP

[75] Inventors: George F. DeVeau, Jr., Stone Mountain; Monty J. Edwards, Chamblee; Wing S. Liu, Lawrenceville; Charles McGonigal, Grayson, all of Ga.

[73] Assignee: AT&T Bell Laboratories, Murray Hill, N.J.

[21] Appl. No.: 881,923

[22] Filed: May 12, 1992

[51] Int. Cl.⁵ .................... G02B 6/00; G02B 6/36
[52] U.S. Cl. .......................................... 385/64
[58] Field of Search ................. 385/53, 64, 63, 66

[56] References Cited

U.S. PATENT DOCUMENTS

| | | | |
|---|---|---|---|
| 3,989,567 | 11/1976 | Tardy | 156/158 |
| 4,050,783 | 9/1977 | Tardy | 350/96.20 |
| 4,161,347 | 7/1979 | Tardy | 350/96.21 |
| 4,483,584 | 11/1984 | Gresty | 350/96.21 |
| 4,545,644 | 10/1985 | DeVeau-Miller | 350/96.21 |

Primary Examiner—Akm E. Ullah
Attorney, Agent, or Firm—Donald E. Hayes, Jr.

[57] ABSTRACT

An optical fiber splicing device includes a clip (20) which aligns and secures cylindrical rods (28, 30 and 32) utilized within a three-rod optical fiber splicing device. The clip (20) is a generally cylindrically shaped component which is made of a resilient material and is positionable so as to encase three cylindrical rods (28, 30 and 32). The clip (20) comprises a circular body portion (22) and two protruding leg portions (24 and 26) which extend from an point on the outer periphery of clip body (22). The two leg portions (24 and 26) are constructed and oriented such that they may be manipulated to controllably expand the inner diameter of clip body (22). To facilitate an optical fiber splice or connection, the clip (20) of the present invention allows the clip body (22) to be expanded to loosen the grip on rods (28, 30 and 32) held therein, thereby allowing the optical fiber ends to be inserted between the rods. Additionally, the inner periphery of clip body (22) is adapted with a plurality of dimple pairs precisely aligned to assure proper longitudinal alignment of the three rods for an efficient and effective splice.

9 Claims, 2 Drawing Sheets

OPTICAL FIBER THREE-ROD CONNECTOR HAVING A ROD-SECURING CLIP

TECHNICAL FIELD

This invention relates to an optical fiber three-rod connector having a rod-securing clip. More particularly, the connector and clip of the present invention controllably provides alignment of the rods to establish the desired retention of each of the fiber ends being spliced.

BACKGROUND OF THE INVENTION

Optical fiber connectors and splicing devices are an important part of substantially any optical fiber communication systems. For instance, connectors or splicing devices may be used to join segments of fiber into longer lengths or to connect fiber to active devices such as radiation sources, detectors, or repeaters, or to passive devices such as switches or attenuators. Considering that a core of multimode optical fiber is approximately 50 microns in diameter and that of single mode fiber is approximately 8 microns, the connection or splicing is no small task.

With respect to multimode fibers for which, due to their relatively large core diameter, alignment to within a few microns is generally acceptable, an alternative type of splicing device has been used. An example of such a multimode fiber splice utilizes two drawn glass capillary tubes or ferrules that serve to hold two fiber end portions and allow alignment of the ends by means of an alignment sleeve. Even though such connectors have been found frequently to give satisfactory results with single-mode fibers, it is not always easy to achieve very low loss connection with these type splicing devices. As used herein, a very low loss connection is defined as connections having a loss of the order of 0.1 dB or less.

The making of single-mode connections in the prior art typically has involved the active alignment of the fiber ends. Prior art methods comprise translating one fiber end relative to the other, typically by means of a precision stage, until maximum energy coupling across the gap between the fiber ends is observed, for example, by means of a remote detector. Such procedure is both difficult to carry out in the field and requires highly skilled personnel.

A somewhat recent entry into the field of optical fiber splicing devices is one which is commonly referred to as a rotary splice. The splicing device is disclosed in commonly assigned U.S. Pat. No. 4,545,644 which issued on Oct. 8, 1985, in the names of G. F. DeVeau, Jr. and C. M. Miller. Generally, the rotary splice device comprises two capillary cylinders and preferably three alignment rods in fixed radial and axial relationship to each other. The alignment rods are generally cylindrical in shape, with typically two of them including a offset area that extends from one end over a substantial fraction of the length of the rod. In such a rotary splicing device, it is the presence of these suitably placed offset areas which allows alignment of the fiber ends to within exceedingly close tolerances.

Notwithstanding the availability of the above-described splicing devices, the search for a reliable optical fiber splicing device has continued. Sought after is a splicing device that is relatively simple and easily installed in the field, is rugged, has acceptable temperature cyclability, and does not require the fiber ends to be subjected to time-consuming polishing procedures.

In all the above-described connectors and splicing devices, cost is an important consideration. It has long been desired to provide a low cost optical fiber splicing device. Also, the splices which are achieved with many of the prior art devices require the use of adhesive materials or gels which require curing. It would be most desirable to have available a mechanical splice which does not require the use of materials to be cured.

An additional variation of the existing three-rod rotary splice comprises three fully cylindrically shaped rods instead of including some rods having a offset surface. However, such splicing devices have a problem of orienting and maintaining the desired physical relationship between each of the rods and the fiber. The sought-after splicing device therefore should include adequate securing means to easily and effectively align and hold each of the rods as desired relative to the fiber ends being spliced.

What is desired and seemingly not available in the prior art is a relatively low-cost, mechanical optical fiber splicing device which includes securing means to properly orient three fully cylindrical rods relative to the fiber ends being spliced. The sought-after splicing device and rod-securing means should be one which is simplistic in structure yet one which provides a reliable relatively low loss and relatively low return loss splice connection.

SUMMARY OF THE INVENTION

The foregoing problems of the prior art have been overcome with the optical fiber splicing device of this invention. In accordance with the present invention, an optical fiber splicing device includes a clip which aligns and secures cylindrical rods often utilized within a three-rod optical fiber splicing device.

The clip is a generally cylindrically shaped component which is made of a resilient material and is positionable so as to encase three cylindrical rods ultimately used to secure the fiber ends together. The clip comprises a circular body portion and two protruding leg portions which extend from an point on the outer periphery of clip body. The two leg portions are constructed and oriented such that they may be manipulated to controllably expand the inner diameter of clip body.

To facilitate an optical fiber splice or connection, the clip of the present invention allows the clip body to be expanded to loosen the grip on rods held therein, thereby allowing the optical fiber ends to be inserted between the rods. Additionally, the inner periphery of clip body is adapted with a plurality of dimple pairs precisely aligned to assure proper longitudinal alignment of the three rods for an efficient and effective splice.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
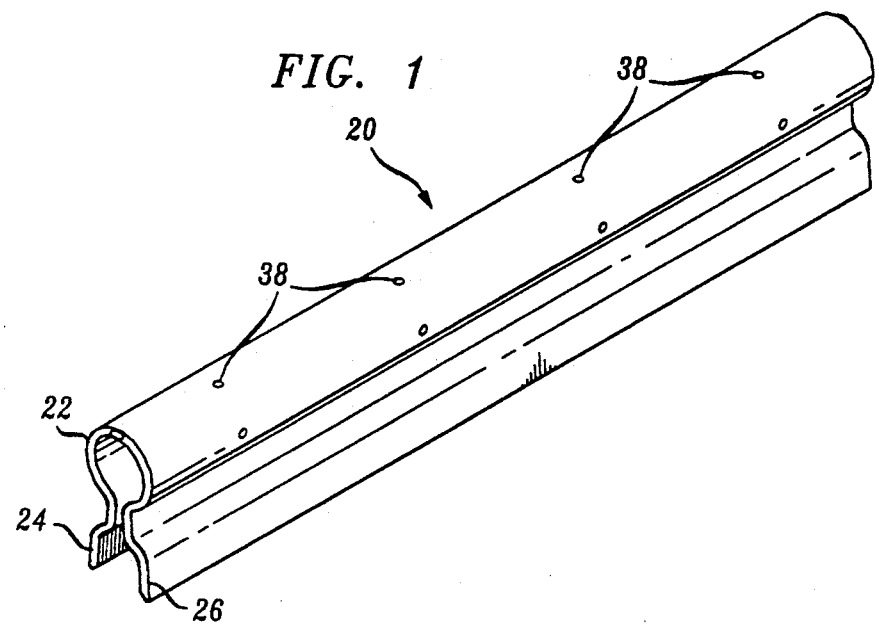
FIG. 1 is an isometric view of the clip in accordance with the present invention.

Referring now to FIG. 1, there is shown a clip for a three-rod optical fiber splicing device which is generally designated by the numeral 20. The clip 20 of the present invention comprises a substantially circular body portion 22 and two leg portions 24 and 26 which extend outward from the body portion 22. In the preferred embodiment of the present invention, the clip 20 is positionable around three cylindrical rods 28, 30 and 32 so that each of the rods 28, 30 and 32 are encased within the circular body portion 22.

The two extending leg portions 24 and 26 are oriented relative to the body portion 22 so as to provide means for adjusting the internal diameter of body portion 22. By controllably adjusting the diameter of the clip body 22, the three rods 28, 30 and 32 may be pulled tightly together or allowed to slightly separate while remaining within the clip body 22. The present invention is directed to an optical fiber three-rod connector and an associated clip 20 as opposed to any particular tool means used to manipulate the leg portions 24 and 26 in order to control the size of the circular body portion 22. Therefore, the present invention is not defined with regard to its relative point of novelty by the particular tool means used. Likewise, it should be noted that any known tool means may be used to expand and compress the clip 20 of the present invention without extending beyond the scope of the present invention.

In general, the clip 20 of the present invention is designed for use in mechanical splicing devices which incorporate a strip and cleave, "bare-fiber" design. In such mechanical splices, each end of the fiber to be spliced is stripped of its insulative coating or covering which is typically provided, thereby revealing an extent of bare glass or plastic fiber. It should be noted that this bare fiber may consist of a core with a cladding.

In the preferred embodiment of the present invention, the clip 20 is an elongated, substantially cylindrical unit made of a resilient material, as depicted in the isometric view of FIG. 1. An example of a suitable resilient material is a metallic composition such as Spinodal Alloy 2110 (Cu 9 Ni 6 Sn) Tempe XHT, Fine Grain 015±thick±0002×0.25±002 wide. However, there are various other known resilient materials which may be used to manufacture the chip in accordance with the present invention while yet remaining within the breadth of this application.

Figure 2A:
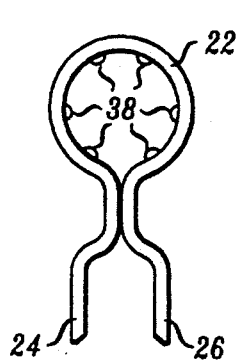
FIGS. 2A–2D illustrate a sequential depiction of the procedures involved in utilizing the clip of the present invention to secure a three-rod splice of optical fiber ends.
Figure 2B:
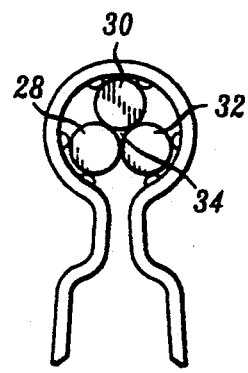

FIGS. 2A-2D illustrate the series of configurations that the connector and associated clip 20 of the present invention encounters during the splicing process. Initially, as depicted in FIG. 2A, the clip body 22 contains no rods therein and the clip 20 is in its most relaxed orientation. The leg portions 24 and 26 are then separated further generally by a suitable tool, thereby increasing the internal diameter of the clip body portion 22. While the diameter of the clip body 22 is expanded, the three rods 28, 30 and 32 may be longitudinally positioned within the clip body. Once each of the rods is properly positioned within the clip body 22, the particular expanding force applied to clip 20 to enlarge the diameter of the clip body 22 is removed. As shown in FIG. 2B, due to the resilience of clip 20, the removal of such expanding force allows clip body 22 to compress tightly around the three rods 28, 30 and 32. With three rods placed within the clip body 22, the legs 24 and 26 are maintained at a slightly more separated orientation, as shown in FIG. 2B, than they are when no rods are positioned therein as shown in FIG. 2A.

Figure 2C:
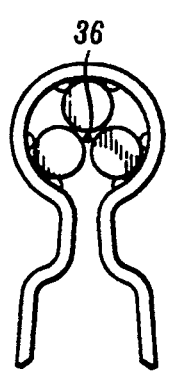
Figure 2D:
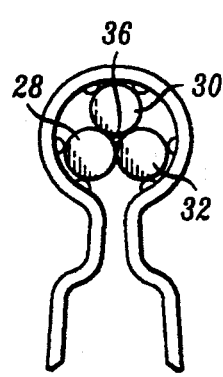

As stated earlier, mechanical three-rod splicing devices comprise three cylindrically shaped rods 28, 30 and 32. These three rods 28, 30 and 32 are arranged parallel to one another and perpendicular to the plane of FIGS. 2B-2D in which the axis of each rod 28, 30 and 32 form the three apexes of an equilateral triangle. As shown in FIGS. 2B-2D, three circles representing the cross-sections of these rods 28, 30 and 32 through the plane of the sheet are each tangent to the two others. A central channel 34 is therefore formed between these three rods 28, 30 and 32.

Two optical fibers (not individually shown but generally identified as number 36) having bared ends are then positioned with the channel 34 as alluded to earlier. In order to properly position either fiber end 36 within the channel 34, the legs 24 and 26 are once again further separated to expand the circular body portion 22 of clip 20. As the legs 24 and 26 are forced apart by the application of any desired expanding force, the diameter of body portion 22 increases as described above, and specifically the channel 34 becomes enlarged. During the application of this second expanding force, one or both of the bared fiber ends 36 may be inserted into the enlarged channel 34 as illustrated by FIG. 2C.

Once the desired fiber ends 36 are properly positioned with channel 34 between rods 28, 30 and 32, the second expanding force may be removed. The removal of this second expanding force allows the resilience of clip 20 to once again compress the clip body portion 22 tightly around the three rods 28, 30 and 32. Now, however, with at least one fiber end 36 positioned within channel 34, the compression of rods 28, 30 and 32 acts to secure each fiber end 36 in its desired orientation relative to the rods as depicted by FIG. 2D.

Figure 3A:
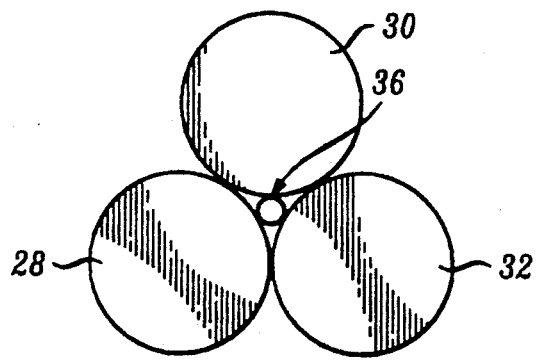
FIGS. 3A and 3B illustrate the geometric configuration of the three cylindrical rods of a three-rod splicing device relative to the fiber to be spliced in accordance with the present invention.
Figure 3B:
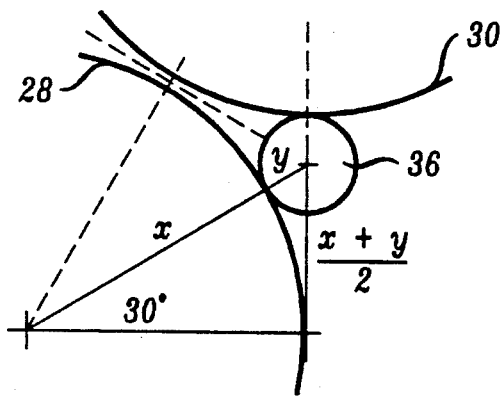

It should be noted that the particular cross-sectional dimensions of the three cylindrical rods 28, 30 and 32 or the cross-sectional dimensions of the 36 fibers to be spliced are a matter of design choice. However, a simple calculation for the geometry shown in FIGS. 3A and 3B gives the maximum radius of the rods as a function of the radius of the fiber. This equation is set forth below with x representing the rod radius and y representing the fiber radius.

$$x^2 - 6xy - 3y^2 = 0$$

$$x = (3 + 2\sqrt{3})y$$

Therefore, for a fiber radius, y, of 62.5 μm, calculations based n the equations set forth above output x=404 μm (0.0159 inch) as the maximum rod radius. Fortuitously, 1/32 inch stainless steel dowel pins are commercially available as a standard size (0.0156 inch radius) and are thus slightly smaller than the maximum radius calculated.

As may be appreciated from the described operation of the prior art and the procedural description of the clip of the present invention as set forth above with regard to FIGS. 2A-2D, the alignment of the three rods 28, 30 and 32 relative to each other as well as the circular body portion 22 is critical in achieving an adequate splice. In order to facilitate a desirable splice or connection, the clip 20 of the present invention further comprises a series of dimples 38—38 positioned around the inner periphery of circular body portion 22. In the preferred embodiment, each series of dimples 38—38 comprises six dimples arranged in three pairs, or three sets of two.

Each of the three pairs of dimples 38—38 are equally spaced around the internal circumference of clip body portion 22. Therefore, a center point of each pair of dimples 38—38 is separated from the center point of each of the other two pairs of dimples 38—38 by 60°. Such a determinative, equilateral spacing between the dimple pairs 38—38 provides periodic and absolute guides which maintain the longitudinal alignment of each rod 28, 30 and 32 within the clip body 22.

By establishing such a physical configuration within the clip to assist in acquiring and maintaining the desired longitudinal orientation of the rods, the present clip 20 obviates any splicing problems created or compounded by the three rods 28, 30 and 32 twisting due to torque which may be applied to the ends of the rods. One other potential rod-orientation problem overcome by the present connector and clip is that the group of three rods as a whole are inhibited from rotating relative to the clip body 22 so as to position one of the rods too close to the point where legs 24 and 26 extend from the clip body 22.

As stated earlier, the connector and associated clip 20 of the present invention applies a retention force to fiber ends 36—36 indirectly through rods 28, 30 and 32 as a result of the resiliency of the clip material. For most efficient and effective operation, each of the three rods 28, 30 and 32 should have an equal force applied to them at a consistent angle to ensure that balancing forces of equal value are then ultimately transferred to the fiber ends 36—36. However, should one of the rods become located immediately adjacent the point where leg portions 24 and 26 extend from the clip body 22, the forces ultimately applied to a fiber end 36 by the rods are often inconsistent and out-of-balance relative to each other.

Figure 4:
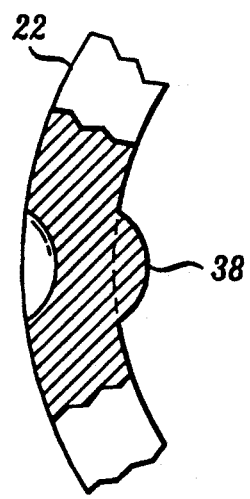
FIG. 4 is a cut-away view of one of the individual dimples used within the clip of the present invention to align the rods of a three-rod optical fiber splicing device.

The precise positioning and sizing of the dimple pairs 38—38 utilized in the connector and associated clip of the present invention provide means for assuring that the most desirable amount of force is applied at the optimum angle for securing the splice connection of fiber ends 36—36. Specifically, the general positioning of each of the dimple pairs 38—38 is to establish an equilateral application of forces to the fiber ends 36—36. More particularly, each individual dimple of the dimple pairs is semi-circular in shape and extends about 0.004 inch in toward the center of circular clip body 22. A detailed illustration of one of the individual dimples 36—36 is shown in FIG. 4.

In the preferred embodiment of the present invention, each individual dimple is spaced approximately 51° around the arc of circular clip body 22 from its associated dimple within that same dimple pair. Furthermore, to achieve the desired equilateral configuration of the preferred embodiment, each dimple pair 38 is separated from each of that pair's associated and circularly aligned dimple pairs by approximately 69°. Therefore, three spacings of 69° between each of the three circularly aligned dimple pairs plus three spacings of 51° between the individual dimples of each dimple pair accounts for the full 360° arc of circular clip body 22.

With regard to longitudinal spacing of each of the set of three pairs of circularly aligned dimples, it should be noted that the exact number of longitudinally positioned dimple sets along the length of the clip 20 is variable. As shown in FIG. 1, the preferred embodiment of the present invention incorporates four such dimple sets. More specifically, with a typical overall clip length of 0.720 inches, the two outermost dimple sets are located 0.08 inches from their respective end of clip 20. Furthermore, the two inner dimple sets are centrally positioned between the two outermost dimple sets, thereby creating a 0.19 inch separator between each outer dimple set and its closest inner dimple set while the two inner dimple sets are separated by a distance of 0.18 inches. However, as stated, any variation regarding the number of dimple sets or the particular spacing therebetween is deemed to be within the scope of the present invention.

It is to be understood that the above-described arrangements are simply illustrative of the invention. Other arrangements may be devised by those skilled in the art which will embody the principles of the invention and fall within the spirit and scope thereof.

We claim:

1. A connector for axially connecting a pair of optical glass fibers, wherein the fibers include a glass core constituting a light guide and a protective covering thereover, and wherein each pair of glass fibers have an end portion extent of the protective covering removed, said connector comprising:

at least three holding rods which are cylindrical in shape;

clamping means for keeping the holding rods parallel to and in lateral contact with one another, and forming together, an optical fiber holding channel limited by adjacent lateral portions of the rods wherein the clamping means comprises:

a body portion having an established inner diameter for substantially encasing the group of rods; and leg portions in contact with the body portion and capable of manipulating the body portion so as to controllably vary the inner diameter of the body portion;

and wherein an end portion of the glass fibers is insertable within the holding channel such that the clamping means provides contact of all rods with the inserted fiber end portions to ensure an axially aligned connection to the other optical fiber end portion.

2. The connector of claim 1 wherein said body portion of the clamping means further comprises alignment means positioned along an inner periphery of the body portion so as to provide positional guidance to at least one of the rods relative to the other rods, the body portion and the leg portions.

3. The connector of claim 2 wherein said alignment means comprises a plurality of semi-circularly shaped, dimpled protrusions which extend inwardly from the body portion.

4. The connector of claim 3 wherein the plurality of dimpled protrusions are oriented in pairs wherein the distance separating the two individual dimple protrusions of a dimple pair from each other is established so as to accept and secure one of the rods therebetween.

5. The connector of claim 4 wherein three pairs of dimpled protrusions are substantially equilaterally spaced and circumferentially aligned about the inner periphery of the body portion.

6. The connector of claim 3 wherein said plurality of dimpled protrusions are aligned longitudinally along the length of the clamping means.

7. The connector of claim 3 wherein said plurality of dimpled protrusions are aligned circumferentially about the inner periphery of the body portion.

8. The connector of claim 1 wherein said leg portions of the clamping means further comprises two legs which extend outwardly from the body portion.

9. The connector of claim 1 wherein said clamping means is made of a resilient material.

* * * * *